(12) United States Patent
Puetter et al.

(10) Patent No.: US 9,659,237 B2
(45) Date of Patent: May 23, 2017

(54) IMAGING THROUGH AEROSOL OBSCURANTS

(71) Applicant: Pixon Imaging, Inc., San Diego, CA (US)

(72) Inventors: Richard C. Puetter, San Diego, CA (US); Vesa Junkkarinen, San Diego, CA (US)

(73) Assignee: Micro USA, Inc., Poway, CA (US)

( * ) Notice: Subject to any disclaimer, the term of this patent is extended or adjusted under 35 U.S.C. 154(b) by 800 days.

(21) Appl. No.: 14/046,835

(22) Filed: Oct. 4, 2013

(65) Prior Publication Data

US 2016/0217346 A1    Jul. 28, 2016

Related U.S. Application Data

(60) Provisional application No. 61/710,590, filed on Oct. 5, 2012.

(51) Int. Cl.
| | |
|---|---|
| *G06K 9/00* | (2006.01) |
| *G06K 9/34* | (2006.01) |
| *G06K 9/62* | (2006.01) |
| *G06T 5/50* | (2006.01) |
| *G06K 9/78* | (2006.01) |

(Continued)

(52) U.S. Cl.
CPC ......... *G06K 9/6267* (2013.01); *G06K 9/4642* (2013.01); *G06K 9/4652* (2013.01); *G06K 9/52* (2013.01); *G06K 9/6215* (2013.01); *G06K 9/78* (2013.01); *G06T 5/00* (2013.01); *G06T 5/003* (2013.01); *G06T 5/50* (2013.01); *G06T 7/50* (2017.01); *G06T 7/60* (2013.01); *G06T 7/90* (2017.01); *G06K 2009/4666* (2013.01); *G06T 2207/10024* (2013.01)

(58) Field of Classification Search
None
See application file for complete search history.

(56) References Cited

U.S. PATENT DOCUMENTS

| | | |
|---|---|---|
| 4,679,077 A | 7/1987 | Yuassa et al. |
| 4,772,945 A | 9/1988 | Tagawa et al. |
| (Continued) | | |

OTHER PUBLICATIONS

Y. Zhang, B. Guidon, J. Cihlar, An image transform to characterize and compensate for spatial variations in thin cloud contamination of Landsat images Remote Sensing of Environment, 82 (2002), pp. 173-187.*

(Continued)

*Primary Examiner* — Andrae S Allison
(74) *Attorney, Agent, or Firm* — Eleanor Musick; Musick Davison LLP

(57) ABSTRACT

A method for determining a level of haze within a field of view of an image sensor adapted for detecting a plurality of color components includes collecting a first image of the field of view at a first point in time, defining regions of the first image as a reference and determining reference intensities for each color component. At least one second image is collected at different points in time and intensities for each color component are determined and compared against the reference intensities. If the intensities of second image differ from the reference intensities by more than a predetermined threshold, all or a portion of the second image is designated as being obscured by haze and requiring correction.

28 Claims, 7 Drawing Sheets

(51) Int. Cl.
*G06T 5/00* (2006.01)
*G06K 9/46* (2006.01)
*G06K 9/52* (2006.01)
*G06T 7/60* (2017.01)
*G06T 7/50* (2017.01)
*G06T 7/90* (2017.01)

(56) References Cited

U.S. PATENT DOCUMENTS

| | | | |
|---|---|---|---|
| 4,774,570 A | 9/1988 | Araki | |
| 5,091,780 A | 2/1992 | Pomerleau | |
| 5,291,563 A | 3/1994 | Maeda | |
| 5,353,058 A | 10/1994 | Takei | |
| 5,517,236 A | 5/1996 | Sergeant et al. | |
| 5,666,441 A | 9/1997 | Rao et al. | |
| 6,208,938 B1 | 3/2001 | Doerfel | |
| 6,288,974 B1 | 9/2001 | Nelson | |
| 6,570,608 B1 | 5/2003 | Tserng | |
| 6,950,141 B2 | 9/2005 | Mori et al. | |
| 6,987,892 B2 | 1/2006 | Edgar | |
| 7,040,570 B2 | 5/2006 | Sims et al. | |
| 7,218,756 B2 | 5/2007 | Garoutte | |
| 7,245,742 B2 | 7/2007 | Carrano et al. | |
| 7,538,801 B2 | 5/2009 | Hu et al. | |
| 7,729,510 B2 | 6/2010 | Zakrzewski et al. | |
| 7,773,204 B1 | 8/2010 | Nelson | |
| 7,778,483 B2 | 8/2010 | Messina et al. | |
| 7,796,831 B2 | 9/2010 | Tanaka | |
| 7,817,832 B2 | 10/2010 | Deinzer | |
| 7,873,188 B2 | 1/2011 | Hautiere et al. | |
| 7,873,235 B2 | 1/2011 | Steiger | |
| 7,995,791 B2 | 8/2011 | Flook et al. | |
| 8,031,968 B2 | 10/2011 | Ishiga | |
| 8,045,761 B2 | 10/2011 | Badawy et al. | |
| 8,159,537 B2 | 4/2012 | Itoh et al. | |
| 8,165,416 B2 | 4/2012 | Cutler | |
| 8,249,303 B2* | 8/2012 | Nitanda | G06T 5/002 382/104 |
| 8,515,196 B1* | 8/2013 | Hogasten | H04N 5/23229 348/164 |
| 8,755,628 B2* | 6/2014 | Fang | G06T 5/009 382/274 |
| 2002/0039135 A1 | 4/2002 | Heyden | |
| 2005/0057666 A1 | 3/2005 | Hu et al. | |
| 2005/0140694 A1* | 6/2005 | Subramanian | G06F 9/545 345/619 |
| 2008/0018647 A1* | 1/2008 | Bunnell | G06T 13/00 345/426 |
| 2008/0226189 A1 | 9/2008 | Connell | |
| 2010/0040300 A1* | 2/2010 | Kang | G06K 9/00664 382/255 |
| 2010/0045870 A1 | 2/2010 | Chao | |
| 2010/0067823 A1* | 3/2010 | Kopf | G06K 9/00624 382/274 |
| 2010/0091194 A1 | 4/2010 | Lei et al. | |
| 2010/0201883 A1 | 8/2010 | Delva et al. | |
| 2011/0025919 A1 | 2/2011 | Vorontsov et al. | |
| 2011/0129165 A1 | 6/2011 | Lim et al. | |
| 2014/0140619 A1* | 5/2014 | Mukhopadhyay | G06T 5/40 382/167 |

OTHER PUBLICATIONS

Helmer and Ruefenacht, 2005, E.H. Helmer, B. Ruefenacht, Cloud-free satellite image mosaics with regression trees and histogram matching Photogrammetric Engineering and Remote Sensing, 71 (2005), pp. 1079-1089.*

Rudolf Richter, Atmospheric Correction of Satellite Data With Haze Removal Including a Haze/Clear Transition Region, Compufers & Geosciences vol. 22, No. 6, pp. 6X-681, 1996.*

C. Y. Ji, "Haze reduction from the visible bands of Landsat TM and ETM+ images over a shallow water reef environment," Remote Sens. Environ. 112(4), 1773-1783 (2008).*

Ancuti, C.O., et al., "A Fast Semi-Inverse Approach to Detect and Remove the Haze from a Single Image", Computer Vision—ACCV 2010, Lecture Notes in Computer Science, 2011, col. 6493, pp. 501-514.

Aydin, T.O., et al., "Dynamic Range Independent Image Quality Assessment", 2008, ACM Transactions on Graphics (Proc. of SIGGRAPH'08), vol. 27(3), Article No. 69.

Brutzer, S., et al., "Evaluation of Background Subtraction Techniques for Video Surveillance", IEEE Conference on Computer Vision and Pattern Recognition (CVPR), 2011; pp. 1937-1944.

Carnec, M., et al., "Objectve quality assessment of color images based on a generic perceptual reduced reference", Signal Processing Image Communication, 2008, 23(4), pp. 239-256.

Chetouani, A., et al., "A Reduced Reference Image Quality Metric Based on Feature Fusion and Neural Networks", 19th European Signal Processing Conference (EUSIPCO 2011), Aug. 29-Sep. 2, 2011, pp. 589-593.

Choi, M.G., et al., "No-Reference Image Quality Assessment using Blur and Noise", World Academy of Science, Engineering and Technology, 2009, 50, pp. 163-167.

Davies, A.C., et al., "Crowd Monitoring Using Image Processing", IEE Electronic and Communications Journal, 1995, vol. 7, No. 1, pp. 37-47.

Dong, N., et al., "Adaptive Object Detection and Visibility Improvement in Foggy Image", Journal of Multimedia, Feb. 2011, vol. 6, No. 1, pp. 14-21.

Du, Y., et al., "Haze Detection and Removal in High Resolution Satellite Image with Wavelet Analysis", IEEE Transactions on Geoscience and Remote Sensing, 2002, No. 40(1), pp. 210-217.

Fattal, R., "Single Image Dehazing", ACM Transactions on Graphics (SIGGRAPH), 2008, pp. 1-9.

Fishbain, B., et al., "Real-time stabilization of long range observation system turbulent video", J. Real-Time Image Proc., 2007, vol. 2(1), pp. 11-22.

Fung, N. and David, P., "Implementation of Efficient Pan-Tilt-Zoom Camera Calibration", Army Research Laboratory, Apr. 2009, ARL-TR-4799, pp. 1-22.

Ghanem, B., et al., "Segmentation-Based Perceptual Image Quality Assessment (SPIQA)", 15th IEEE International Conference on Image Processing (ICIP), Oct. 2008, pp. 393-396.

He, K., et al., "Single Image Haze Removal Using Dark Channel Prior", IEEE Transactions on Pattern Analysis and Machine intelligence, Dec. 2011, vol. 33(12), pp. 2341-2353.

Hier, R.G., and Puetter, R.C., PixonVision real-time Deblurring Anisoplanaticism Corrector (DAC), Proc. of SPIE, 2007, vol. 6696, 66960F-1 to 66960F-7.

Hu, J., et al., "A haze removal module for multispectral satellite imagery", 2009 Urban Remote Sensing Joint Event (IEEE Conference), 2009, pp. 1-4.

Landabaso, J.L, and Pardas, M., "Foreground Regions Extraction and Characterization towards Real-Time Object Tracking", Machine Learning for Multimodal Interaction, 2006, pp. 241-249.

Mahiny, A.S.. and Turner, B.J., "A Comparison of Four Common Atmospheric Correction Methods", Photogrammetric Engineering & Remote Sensing, Apr. 2007, pp. 361-368.

Moro, G.D. and Halounova, L., "Haze removal for high-resolution satellite data: a case study", International Journal of Remote Sensing, May 2007, vol. 28, No. 10, pp. 2187-2205.

Narasimhan, S.G. and Nayar, S.K., "Contrast Restoration of Weather Degraded Images", IEEE Trans. on Pattern Analysis and Machine Intelligence, Jun. 2003, vol. 25, No. 6, pp. 713-724.

Piccardi, M., "Background subtraction techniques: a review", Proceedings of the 2004 IEEE International Conference on Systems, Man and Cybernetics, 2004, pp. 3099-3104.

Rehman, A. and Wang, Z., "Reduced-reference Image Quality Assessment by Structural Similarity Estimation", IEEE Transactions on Image Processing, Aug. 2012, vol. 21, No. 8, pp. 3378-3389.

Seshadrinathan, K. and Bovik, A.C., "Unifying analysis of full reference image quality assessment", 15th IEEE International Conference on Image Processing (ICIP 2008), Oct. 2008, pp. 1200-1203.

(56) References Cited

OTHER PUBLICATIONS

Sheikh, H.R., et al., "A Statistical Evaluation of Recent Full Reference Image Quality Assessment Algorithms", IEEE Transactions on Image Processing, Nov. 2006, vol. 15, No. 11, pp. 3440-3451.
Soumya, T., "A Moving Object Segmentation Method for Low Illumination Night Videos", Proceedings of the World Congress on Engineering and Computer Science (WCECS 2008), Oct. 2008, pp. 1161-1165.
Tan, R.T., "Visibility in Bad Weather from a Single Image", IEEE Conference on Computer Vision and Pattern Recognition (CVPR '08), Jun. 2008, pp. 1-8.
Wang, Z. and Simoncelli, E.P., "Reduced-Reference Image Quality Assessment Using a Wavelet-Domain Natural Image Statistic Model", Human Vision and Electronic Imaging (SPIE), Jan. 2005, vol. 5666, pp. 149-159.
Wang, Z. et al., "Image Quality Assessment: From Error Visibility to Structural Similarity", IEEE Transactions on Image Processing, Apr. 2004, vol. 13, No. 4, pp. 600-612.
Wong, C.J., et al., "Temporal air quality monitoring using surveillance camera", IEEE International Geoscience and Remote Sensing Symposium (IGARSS 2007), Jul. 2007, pp. 2864-2868 (Abstract).
Wong, C.J., et al., "Determination of Particle Concentration in the Air Using Digital SLR Camera", Algorithms and Technologies for Multispectral, Hyperspectral, and Ultraspectral Imagery XV, Proc. of SPIE, 2009, vol. 7334, pp. 73341I-1 to 73341I-8.

\* cited by examiner

IMAGING THROUGH AEROSOL OBSCURANTS

RELATED APPLICATIONS

This application claims the benefit of the priority of U.S. Provisional Application No. 61/710,590, filed Oct. 5, 2012.

FIELD OF THE INVENTION

The present invention relates to the field of imaging systems and methods, and more particularly to imaging of objects through an obscuring medium.

BACKGROUND OF THE INVENTION

Foggy or hazy atmospheric conditions present a challenge for video surveillance and other imaging applications, negatively impacting both clarity and contrast. Scattering and attenuation by particles suspended in air interfere with human vision and generally reduce the effectiveness of optical imaging systems, including video surveillance systems. Under hazy conditions, which may result from the presence of haze, mist, fog, smoke, dust, snow, or rain, the light reflected from the subject's surfaces and the ambient light in the medium, known as "airlight", are absorbed and scattered by the particles in the medium before they reach the camera. The imaging system records the airlight co-located on the image with an attenuated image of the objects of interest in the scene. The amount of attenuation and the amount of airlight depend on the distance between the camera and the object of interest and on the detailed properties of the particles in the atmosphere. The image formed also depends on the ambient illumination at the object or objects of interest and the illumination throughout the volume between the camera and the objects of interest. The size distribution of the particles, the nature of the particles, and the scattering and absorption cross sections of the particles all influence the transfer of radiation in a hazy medium.

In most cases, the particulate parameters creating the haze are not known in sufficient detail to create a complete radiative transfer solution to the imaging situation. In addition, for most surveillance camera installations, an a-priori mapping of distance from the camera to the objects of interest is not available. These considerations have led to haze correction algorithms based on the physics of radiation transfer, but without a detailed physical model. The typical haze correction algorithm thus has a number of parameters that are empirically calibrated and vetted by numerous trials on a variety of outdoor images. In order to efficiently correct images for haze, the correction algorithm must detect haze reliably and differentiate the effect of haze from the a-priori unknown natural haze-free appearance of the scene.

Haze detection allows a regional correction of the image thus improving the appearance of the image, especially when the image contains regions at different distances from the camera. A number of approaches have been disclosed in the prior art for attempting to address the problems associated with obscuring atmospheric conditions. For example, U.S. Pat. No. 6,288,974 of Nelson describes a method in which an image of a reference object is stored in an image processor. One or more detectors sense or detect the reference signal, which is converted into a transformed reference signal, and further sense and transform object signals emanating from an object of interest into a transformed object signal. An image processor generates a corrected image signal by applying an inverse image transfer function to the transformed object signal. R. Fattal ("Single Image Dehazing", SIGGRAPH, ACM Transactions on Graphics, 2008) describes a method of inferring haze from a pixel by pixel analysis of the image assuming that the effect of haze and the underlying image structure are locally uncorrelated. Mahiny and Turner ("A Comparison of Four Common Atmospheric Correction Methods", *Photogrammetric Engineering & Remote Sensing*, Vol. 73, No. 4, Apr. 2007, pp. 361-368) use haze-free reference images taken over multiple dates to provide atmospheric correction to satellite images. Pseudo-invariant features such as rock outcrops, bare soils and built-up areas are segmented and used to normalize images for atmospheric and illumination effects. Narasimhan and Nayar ("Contrast Restoration of Weather Degraded Images", *IEEE Trans. on Pattern Analysis and Machine Intelligence*, Vol. 25, No. 6, Jun. 2003, pp. 713-724) propose a physics-based model that describes the appearances of scenes in uniform bad weather conditions. Changes in intensities of scene points under different weather conditions provide constraints to detect depth discontinuities in the scene and also to compute the scene structure.

A number of techniques exist for correcting single images for haze and for correcting video by treating the video as a sequence of independent images. For example He, Sun, and Tang, ("Single Image Haze Removal Using Dark Channel Prior", *IEEE Trans. on Pattern Analysis and Machine Intelligence*, Vol. 33, No. 12, Dec. 2011, pp. 2341-2353) use the darkest pixel, in any color channel, in small regions to estimate the airlight. They show that this is an effective strategy for many outdoor images. This technique requires a relatively dark pixel in each region of the segmented image in at least one color. For surveillance cameras, the scenes often include regions that contain no particularly dark pixels, for example: nearby building walls, concrete roads, etc. The single image "dark channel prior" type methods tend to overcorrect video when the intrinsic darkness of pixels is overestimated and the artifacts produced by the overcorrection can be distracting to personnel monitoring the video.

Accordingly, the need remains for a method of haze detection to facilitate regional correction of the image to improve the overall appearance of the image, regardless of the distances between the imaged objects and the camera.

SUMMARY OF THE INVENTION

According to the present invention, methods are provided to correct images for the presence of haze, and to simultaneously measure the amount of attenuation due to the haze (which may include smog, smoke, dust, snow, rainfall, etc.) between the imaging system and objects in the field of view. The application of the inventive methods requires prior measurements or prior knowledge of apparent brightness and/or color for selected objects in the scene, which will be referred to as "reference objects." For surveillance cameras, the needed measurements of reference objects can be obtained when the camera is installed.

During the set-up process, specific stationary objects may be selected within the field of view. This may be done under ideal conditions, i.e., a clear, bright day, to establish reference parameters, or it may be done under less than ideal conditions, but which may be correctable to near ideal conditions by correcting the reference image that was taken during the set-up process to appear free of fog or haze. During operation, mean levels of scattered light and brightness are measured and used to establish a value for the level of aerosols present. The level of aerosols present can then be used to set the level of de-hazing to be performed, which can use any of a number of dehazing algorithms.

The inventive method can be implemented in software, hardware or firmware. In an exemplary embodiment, the method may be incorporated as part of an image signal processor (ISP) of a system-on-chip or chipset-based image sensing system or as a modular ISP for interface with a separate sensor.

For uniform haze conditions, the inventive method uses an image sensor to collect images of one or more stationary objects at different wavelengths. Using sensor-object distances that are at least approximately known, the intensity for each wavelength of light reflected from the stationary objects is calculated. The optical depth to each object is calculated for each wavelength. This process is repeated for additional images taken at different times, and a change in optical depth is calculated for each wavelength to determine the level of obscuration.

In a method particularly useful for video images taken under non-uniform haze conditions, airlight is corrected without measurement of color attenuation, which is strongly dependent on illumination. In this method, multiple frames of a video are used to produce video images that are segmented in a plurality of regions or tiles. The statistics for each region of each image are calculated, linear intensities are normalized, and histograms are generated for each color component within each region. (Alternatively, a numerical score can be assigned to each region based on intensities.) Cumulative histograms are calculated for the multiple frames and stored in memory (preferably non-volatile) as reference histograms. Reference histograms may be updated as haze conditions decrease and improved imaging conditions are detected.

In one aspect of the invention, a method is provided for determining a level of haze within a field of view of an image sensor adapted for detecting a plurality of color components by collecting a first image of one or more objects within the field of view at a first point in time; defining one or more regions of the first image as a reference; determining reference intensities for each color component for the reference; collecting at least one second image at one or more second points in time; determining intensities for each color component within the at least one second image; comparing the intensities for each color component of the at least one second image against the reference intensities; if the intensities of the at least one second image differs from the reference intensity by more than a predetermined threshold, designating all or a portion of the at least one second image as being obscured by haze; and generating an output identifying the designated portions of the at least second image as requiring correction. In some embodiments, the one or more regions of the first image correspond to one or more stationary objects within the field of view, and wherein optical properties of the one or more stationary objects and distances between the image sensor and the one or more stationary objects are at least approximately known. In this embodiment, the step of determining reference intensities further comprises calculating an optical depth to each of the one or more stationary objects, and the step of determining intensities for each color component within the at least one second image comprises calculating an optical depth to each of the one or more stationary objects at the one or more second points in time, and the step of comparing includes determining a change in the optical depth to determine a level of obscuration at the one or more second points in time. The first image may be collected under ideal conditions, or it may be less than ideal but correctable to near-ideal conditions. The color components may be a plurality of colors of a standard color model, which may be RGB. An additional step may include further processing the output to remove effects of the haze from the image.

In one embodiment, the step of defining one or more regions of the first image comprises segmenting the first image into a plurality of tiles to define a plurality of reference tiles. In this embodiment, the step of determining reference intensities comprises normalizing intensity values for each color component for each region and generating a cumulative histogram of intensity for each color component to define a reference set of histograms. The step of determining intensities for each color component within the at least one second image comprises segmenting the at least one second image into the plurality of tiles, normalizing intensity values for each color component for each tile and generating a cumulative histogram of intensity for each color component to define a second set of histograms, wherein the second set of histograms is compared against the reference set of histograms. In some embodiments, the reference set of histograms may be replaced with the second set of histograms if the step of comparing indicates better conditions in the at least one second image.

In an aspect of the invention that is particularly useful for uniform haze conditions, a method is provided for determining a level of haze within a field of view of an imaging device, where the method includes selecting one or more stationary objects within the field of view; using an image sensor adapted to collect images at a plurality of different wavelengths, wherein optical properties of the one or more stationary objects and distances between the image sensor and the one or more stationary objects are at least approximately known; calculating an intensity for each wavelength of the one or more stationary objects; calculating an optical depth to each of the one or more stationary objects for each wavelength; collecting images at one or more second points in time; repeating the steps for each of the collected images to generate optical depths for each wavelength at the one or more second points in time; and determining a change in the optical depth for each wavelength to determine a level of obscuration for each wavelength at the one or more second points in time. In one embodiment, optical properties of the one or more stationary objects are determined by collecting a reference image of one or more stationary objects at a first point in time under which different conditions are present. In some embodiments, the different conditions are ideal conditions in which no haze or other obscurant is present. In other embodiments, the reference image may be calculated to provide a near-ideal image using an image acquired under less-than-ideal conditions.

In another aspect of the invention, a method is provided for determining a level of haze within a field of view of an image sensor, where the method includes detecting a plurality of color components by collecting a first image of one or more objects within the field of view at a first point in time; defining one or more regions of the first image by segmenting the first image into a plurality of tiles to define a plurality of reference tiles; determining reference intensities for each color component by normalizing intensity values for each color component for each reference tile and generating a cumulative histogram of intensity for each color component to define a reference set of histograms; collecting at least one second image at one or more second points in time; determining intensities for each color component within the at least one second image by segmenting the at least one second image into the plurality of tiles, normalizing intensity values for each color component for each tile and generating a cumulative histogram of intensity for each color component to define a second set of histograms; comparing the second set of histograms against the reference set of histograms; if the second set of histograms differs from the reference set of histograms by more than a predetermined threshold, designating one or more tiles within the at least one second image as being obscured by haze; and generating an output identifying the one or more tiles of the at least second image as requiring correction. The method may further include replacing the reference set of histograms with the second set of histograms if the step of comparing indicates better conditions in the at least one second image. In some embodiments, the better conditions are determined based on the relative widths of the histograms.

DETAILED DESCRIPTION

Figure 1:
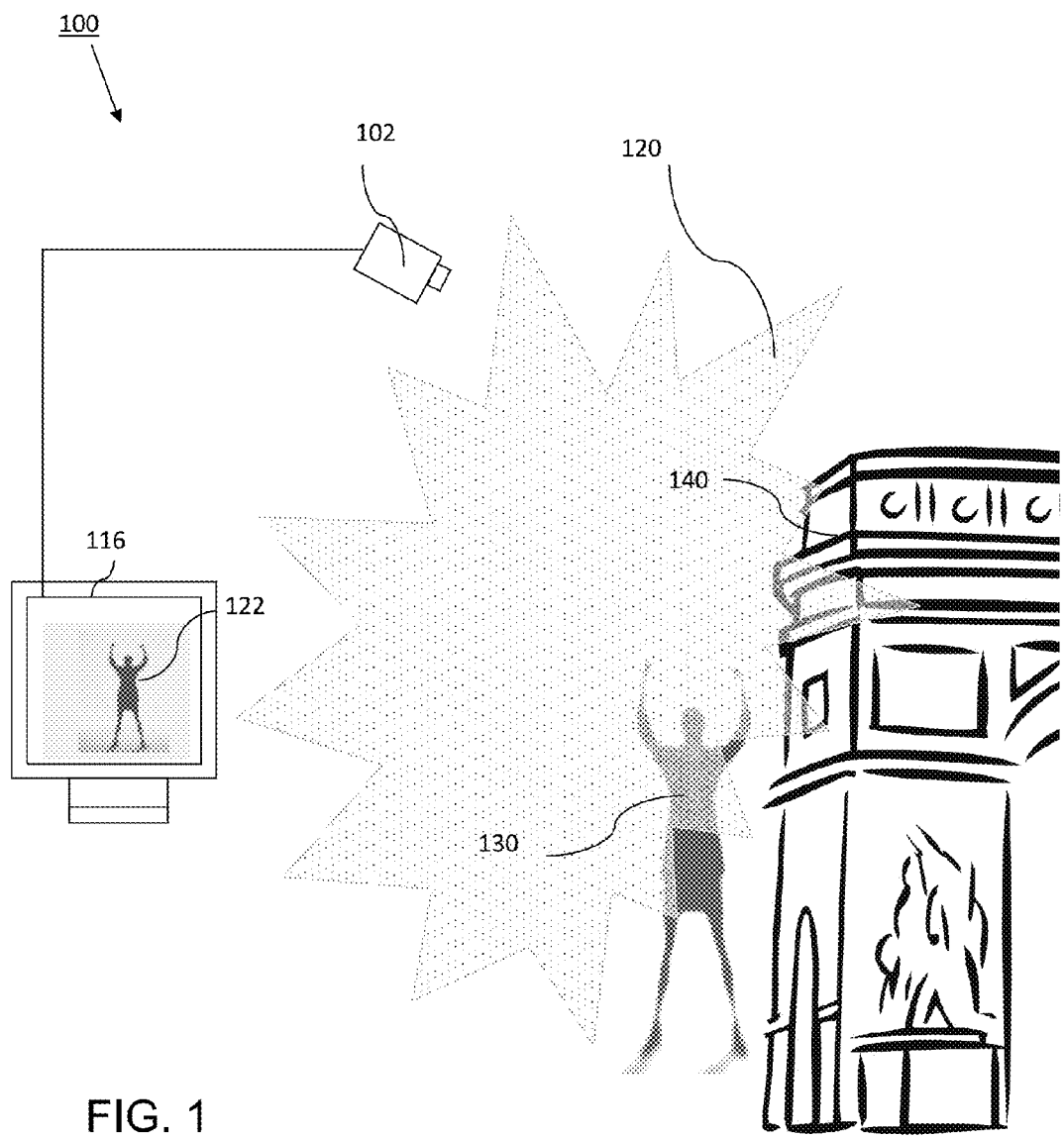
FIG. 1 is a diagrammatic view of an exemplary surveillance arrangement.

The inventive method is particularly useful for video surveillance systems. A schematic of an exemplary surveillance system 100 is shown in FIG. 1. Image sensor 102 may be incorporated within a camera such as a surveillance camera that may be mounted in a fixed position such as on or in a building or other stationary structure, with or without scanning capability, or may be attached to a moving object, such as a vehicle, aircraft (manned or unmanned), or hand-held, manually directed, or using any other known manner of controlling an image-collecting device. The signals generated by image sensor 102, e.g., images of objects such as a subject under observation 130 and/or a background structure 140, are processed to provide an input signal to a monitor 116 where an image 122 of the object(s) may be viewed. According to the present invention, a method is provided for generating a substantially clarified image of the object(s) even if they are fully or partially obscured by a haze 120 disposed between the image sensor 102 and the objects.

Figure 2:
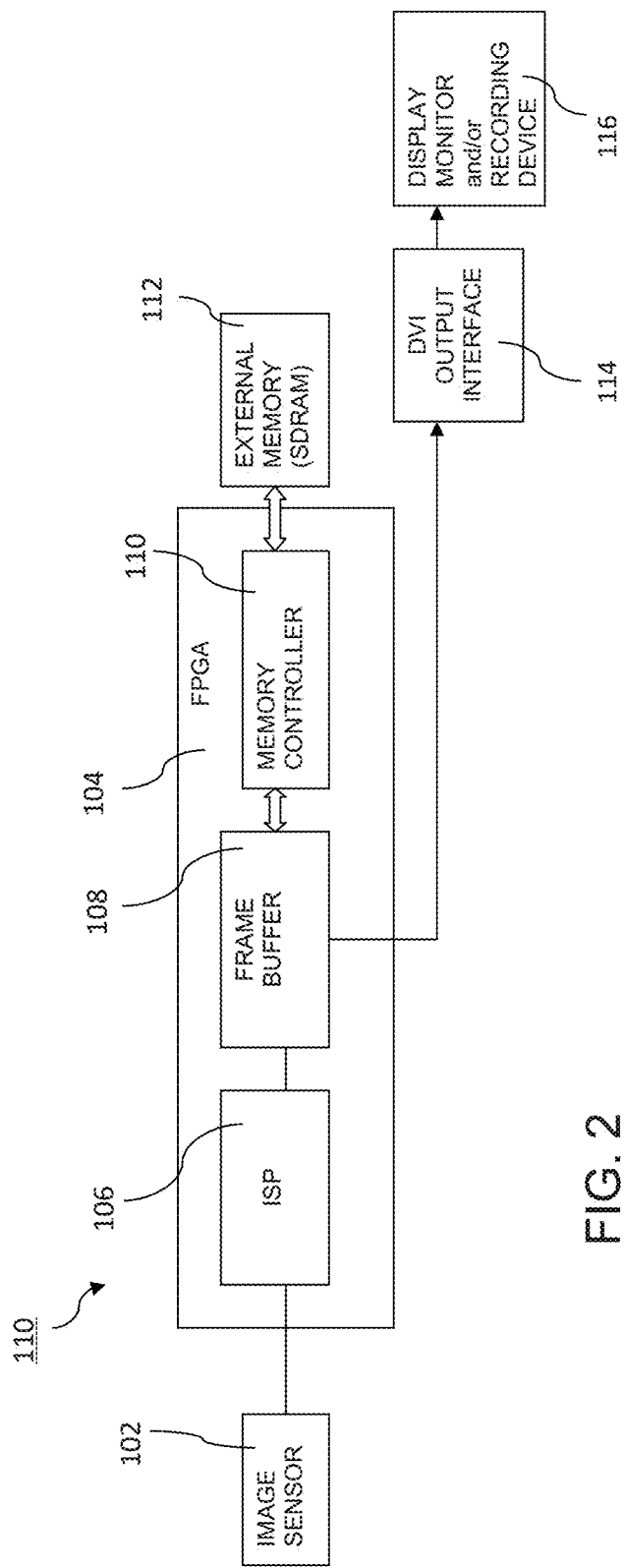
FIG. 2 is a block diagram of an exemplary surveillance system.

The inventive method may be implemented as hardware or firmware in an image processing device. In one embodiment shown in FIG. 2, the code may be programmed within an ISP module 106 in a FPGA (field programmable gate array) 104, which may also include a frame buffer module 108 and a memory controller module 110. The modules within the FPGA 104 receive the input from the image sensor 102 and generate an output to an external memory 112 such as a SDRAM for storage of the images, and to an output interface 114, which provides input to the display monitor 116 and/or to a storage device, such as a DVD recorder.

The following description details the method, the necessary reference object measurements, the calculations, and the physical model that is the basis for a first embodiment of the inventive method.

Radiative Transfer

The radiative transfer equation (RTE) is the starting point for calculating the effect of fog or haze on an optical image. Radiative transfer includes scattering, absorption, and emission. However, the situation described here is much simpler than the general case as we are considering primarily a scattering (and perhaps absorbing) medium with insignificant emission of its own at the wavelengths considered here (the optical wavelengths R, G, and B, normally found in video cameras, although the invention is not restricted to these wavelengths and has application in the UV and IR). Further, the objects of interest are usually at a significant distance from the camera, which allows the general problem to be approximated by a simple radiative transfer problem:

$$\frac{dI_v}{dx} = -(k_{v,s} + k_{v,a})I_v + S_v \tag{1}$$

where $I_v$ is the specific intensity of light at frequency v, i.e., the amount of energy passing through a given area per unit time per unit frequency per unit solid angle (in MKS units, this is $J \cdot m^{-2} \cdot s^{-1} \cdot Hz^{-1} \cdot sr^{-1}$), $k_{v,s}$ and $k_{v,a}$ are the scattering and absorption coefficients respectively (in $m^{-1}$), $S_v$ is a source term (e.g., scattered ambient light), and x is the coordinate that measures the distance to the object from the camera. A formal solution to the RTE for an object A at distance $x_A$ can be written in terms of the optical depth, $\tau_{v,A}$:

$$I_{v,camera} = I_{v,A}e^{-\tau_{v,A}} + S_{v,A}, \tag{2}$$

where $I_{v,camera}$ is the specific intensity measured at the camera, $I_{v,A}$ is the specific intensity of object A, and $S_{v,A}$ is the specific intensity from the intervening medium between the camera and object A. In the present case, the intervening medium has no emission itself, but can scatter ambient light (e.g., sunlight), thereby contributing to the emission received by the camera. Finally, $\tau_{v,A}$ is the optical depth to object A, and is given by $$\tau_{v,A} = \int_0^{x_A} k_v dx$$
$$k_v = k_{v,s} + k_{v,a}.$$

Reference Targets

One of the difficulties of correcting an image for fog or haze is that the detailed scattering/absorption properties of the fog are usually not known. (This depends on the details of the size and shape distribution of the particles, for example). Indeed, gathering such information is a nearly hopeless task as the properties can change from day to day. However, the RTE mode described by Equation (2) is rather simple, allowing one to "measure" the scattering properties sufficiently well to provide automated fog/haze removal and a measurement of the visibility from day to day for a quantitative measurement of the opacity in aerosols.

Figure 3:
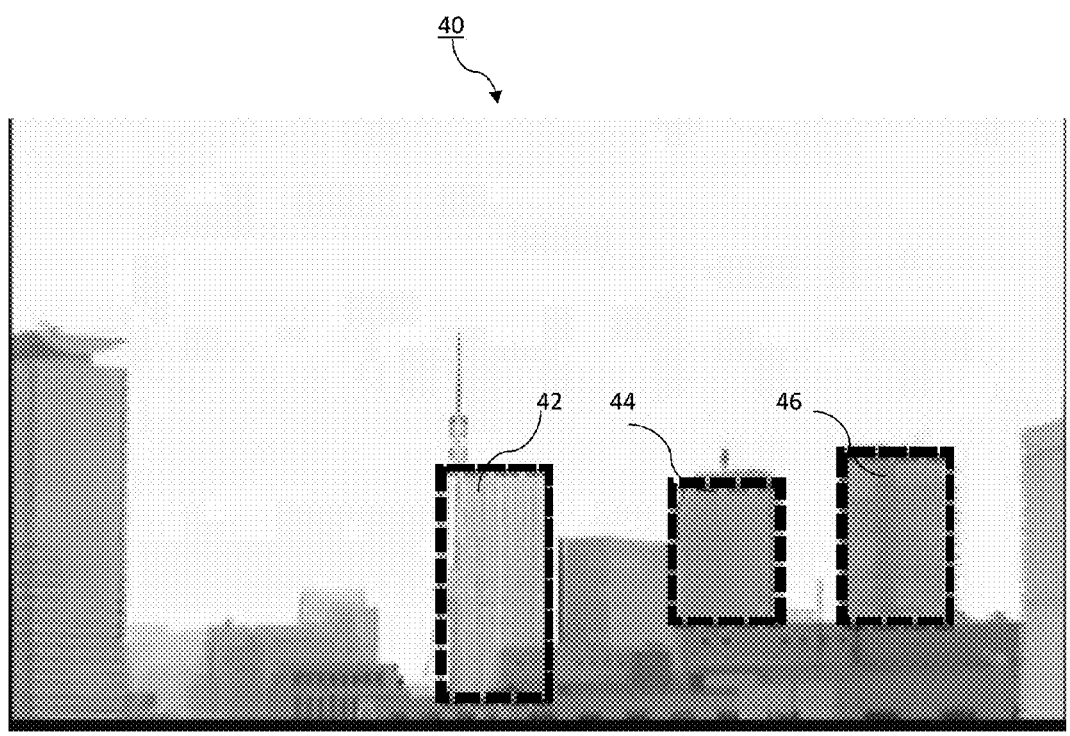
FIG. 3 is an exemplary photographic image with highlighted reference objects according to a first embodiment of the invention.

The inventive approach is described in the following discussion. More complex models can be derived, e.g., spatially adaptive methods, but for simplicity, assume that the density of aerosols is uniform over the field of view (FOV). Referring to FIG. 3, reference objects are selected within the field of view. Such objects are preferably permanent structures or features within the FOV 40. In the illustrated example, the objects 42, 44 and 46 are buildings, or parts of buildings, that are located within the FOV 40 at known distances from the image sensor. By measuring the colors and distances to the reference objects in the FOV, one can solve Equation (2) for $e^{-\tau_{v,A}}$ and $S_{v,A}$ for each frequency (color). In a standard three-color (RGB) optical video camera, we could rewrite Equation (2) in terms of the attenuation in each color, $a_{v,A}=e^{-\tau_{v,A}}$ and scattered light, $b_{v,A}=S_{v,A}$, as $$R_{A,camera}=a_{R,A}R_A+b_{R,A}$$
$$G_{A,camera}=a_{G,A}G_A+b_{G,A}, \quad (3)$$
$$B_{A,camera}=a_{B,A}B_A+b_{B,A}$$

where the R, G, and B are the linear light intensities as measured at the camera and as would be measured at the camera if there were no fog or haze in the three RGB color bands, the a's are the attenuation factors in the three bands and the b's are the scattered light intensities measured at the camera in the three bands. In the more general case of multiple references, $$R_{i,camera}=a_{R,i}R_i+b_{R,i}$$
$$G_{i,camera}=a_{G,i}G_i+b_{G,i} \quad (4)$$
$$B_{i,camera}=a_{B,i}B_i+b_{B,i}$$

where i indexes the various references, with the constraints that the $\{R_i, G_i, B_i\}$ values are known (these are reference targets 42, 44 and 46), and the relative distances to different targets are known (this assumes that the distances to the references are known and the fog/haze is of uniform density over the FOV). Alternatively, the $\{a_{R,i}, a_{G,i}, a_{B,i}\}$ and $\{b_{R,i}, b_{G,i}, b_{B,i}\}$ can be adjusted to achieve "realistic-looking" images and then use the implied relative distances and colors as the reference definitions.

Other constraints can also be brought to bear on solving Equation (4). For example, one might know the wavelength dependencies of particular scatterers and use that as an additional constraint. Indeed, one should use any available prior knowledge to constrain the solution of Equation (4).

Once all the constraints are in place, Equation (4) can be solved by a variety of methods. References can be prudently chosen, for example, to simplify the solution. FIG. 3 provides a simple example of reference objects, in this case, three buildings, within a FOV consisting of a city skyline. Alternatively, large numbers of reference targets can be used (perhaps the entire image), and Equation (4) solved by numerical methods such as least-squares fitting, etc.

The method described above can be used to determine the optical properties of an obscuring medium in the line of sight to target objects. The example given above assumed uniform properties of the medium over the entire FOV. While often the properties of the obscuring medium are roughly uniform, there may be differing thicknesses of the medium. In such cases, spatially adaptive techniques should be applied.

Automated Defogging/Dehazing and Visibility Measurement

Once the optical properties ($\{k_R, k_G, k_B\}$) of the obscuring medium have been determined, one can apply these properties to the automatic removal of the effects of the obscurant. Such techniques can be global if the obscurant is uniform over the FOV, or they can be locally adaptive, with optimum values being established for different neighborhoods or regions within the image. For example, the image can be segmented into a grid of tiles where separate levels of haze can be determined for each tile, allowing appropriate corrections to be applied for each tile according to the measured (calculated) haze. The performance of such automation can be further enhanced with additional knowledge, e.g., a complete distance map for the entire FOV and/or a reference image for the entire FOV.

The attenuation coefficients can also be used to monitor air quality. For example, a daily record might be generated for $\tau_R$ to a target at a known distance. While the unknown details of the particle shape and size distribution might prevent relating $\tau_R$ directly to the mass of obscurant in the air, $\tau_R$ can still be a useful measure of obscurants (and visibility) in the air (water).

The following alternative approach to the inventive method for haze detection is particularly useful for fixed cameras.

Figure 4:
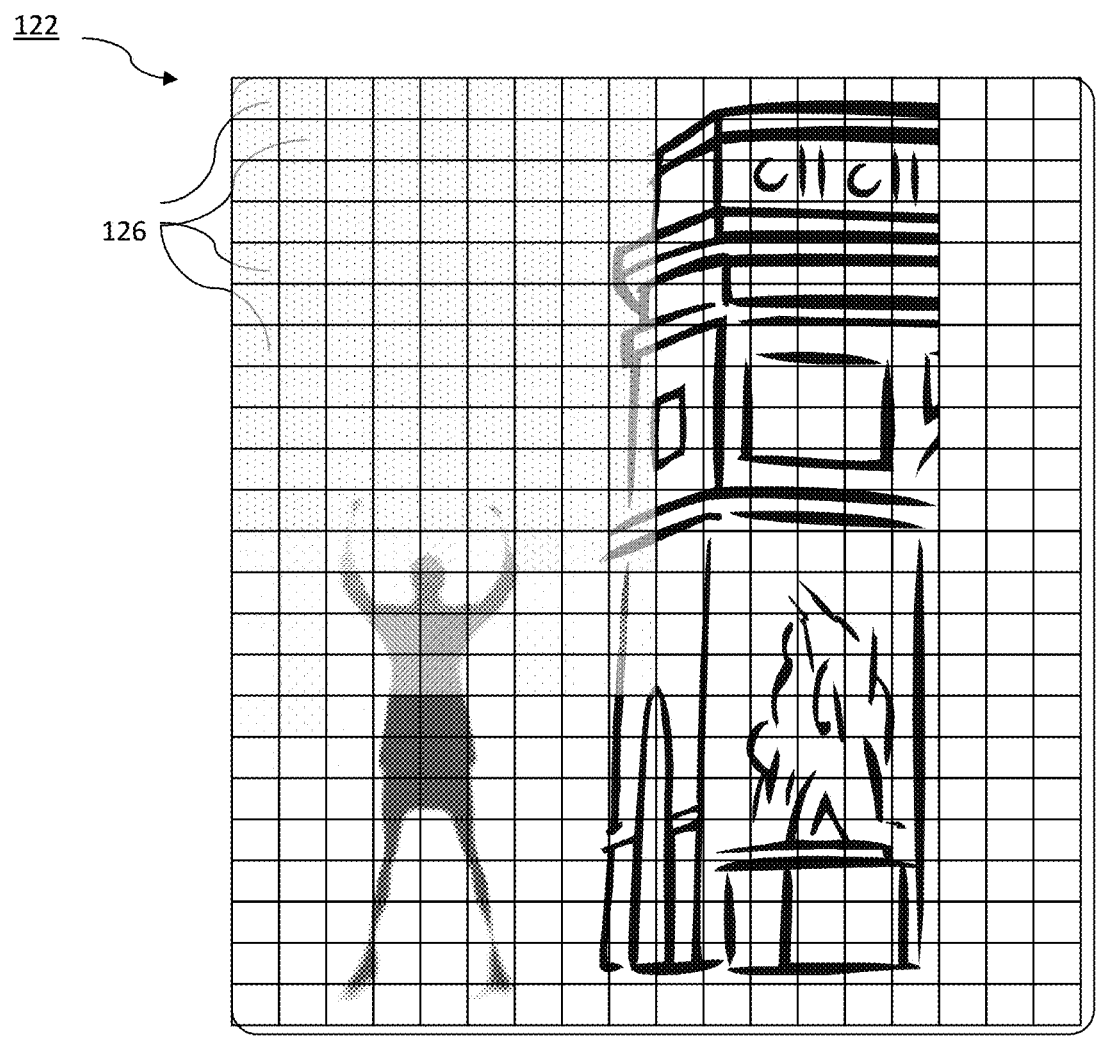
FIG. 4 is a diagram of an exemplary segmented image generated from the scene of FIG. 1.
Figure 5:
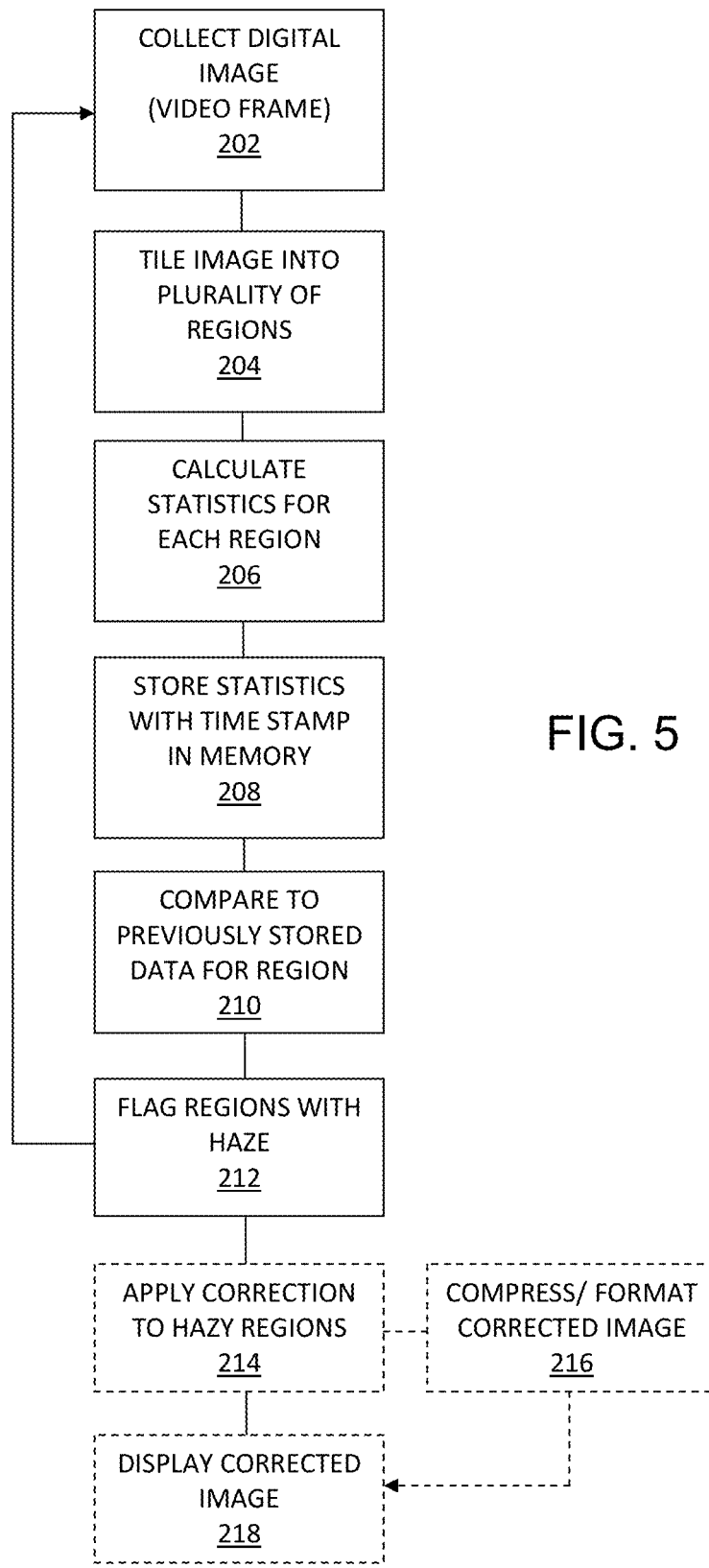
FIG. 5 is a block diagram of a haze detection sequence according to an embodiment of the invention.

Referring again briefly to FIG. 1, image sensor 102, e.g., video camera, produces digital images of the objects 130, 140 at a fixed number of frames per unit time. As shown in FIG. 4, each digital image 122 can be divided into a number of regions 126 (typically one to a few hundred) by the algorithm running on the processor. FIG. 5 shows the steps of the algorithm. In step 202, the image is collected from the camera then tiled into a plurality of regions (step 204). The image regions completely tile the image plane. In step 206, the algorithm uses the digital data stream from the camera to calculate statistics for each region 126 in near real time. The statistics for each region and a time tag from a time-of-day clock are stored in non-volatile memory by the algorithm (step 208). The haze detection part of the algorithm compares the current statistics to statistics gathered at prior times (step 210) and, changes in these statistics beyond set thresholds are used to detect the presence of haze in each region. In step 212, the output of the haze detection component of the algorithm may be used to flag selected regions 126 on the image that have been degraded by haze when the image is displayed. The output of the haze detection may be used to trigger haze correction/compensation (step 214) in the regions where haze is detected. In step 216, the haze-corrected image may optionally be compressed and formatted for digital network transmission. The network video stream is recorded on a network video recorder and displayed on a surveillance monitor in step 218. A control computer is used to monitor and set camera parameters and processor parameters. The thresholds and other parameters that are part of the algorithm presented here are typically set once for all cameras and they adapt with time automatically by updating the stored data when new data is collected. The algorithm may include a manual general reset command with memory erase that can be executed when the camera is moved or the direction the camera points is changed.

The segmentation of the image into regions in step 204 can be done automatically or manually. In the following, a uniform grid of rectangular regions, such as those illustrated in FIG. 4, can be automatically calculated from the video image format and used to completely tile the image. Note that while square grids are shown, the tiles need not be the same dimension in both the x and y directions. Each tile may consist of a single pixel, but preferably will include a plurality of pixels, e.g., 10×10, 20×20, 60×60, 60×40 or any other area within the video frame. The number of tiles will also vary. For example, a 1080 p video frame (1920×1080) may be segmented into 32×24=768 tiles, each consisting of a 60×45 pixel rectangle. The number of regions and the spatial resolution of the fog detection algorithm depend on the segmentation of the frame. Good spatial resolution is important because it enables the algorithm to reasonably delineate the foggy, more distant parts from the less foggy foreground parts. Each region may contain many objects, all at the same distance from the camera, or each region may contain many objects at two or more different distances from the camera.

In FIG. 4, the heavier fog in the upper left quarter of the image has more fog detection thresholds crossed than lower left and right side of the image. The algorithm responds to increases and decreases in the local level of fog as a function of time. There may be some errors (detection of fog when none is present and vice versa) due to the different illuminations between the reference image and the foggy images, however, they typically will be limited to only a few tiles. Fog detection depends on contrast within the tile under consideration. If, in the reference frame, the tile under consideration is uniform with little or no contrast, then fog detection can be problematic and neighboring regions should be used for fog detection. Such low contrast tiles might be marked beforehand if their content is known to be static.

It is desirable that the statistics gathered from each region record quantities that depend more strongly on local image structure and the presence of haze than on changes in illumination. In practice, there are many statistics that work for most images and a combination of statistical measures improves the reliability of the haze detection algorithm. The presence of haze adds airlight to the scene, diminishing the darkness of dark areas and generally reducing contrast at a given ambient illumination. The amount of haze varies depending on the distance from the camera to the objects in each region of the image. Numerical parameters that indicate the presence of haze include the standard deviation of the intensity divided by the median intensity. Airlight tends to increase the median intensity while the attenuation due to scattering decreases the standard deviation. Another useful parameter for haze detection is the median absolute value of a high pass filter divided by the median intensity. Intensity quantiles are used to measure the intensity difference between the dark and bright pixels in each region. While there are many parameters that might be used for haze detection, an effective parameter is p:

$$p = \frac{I_{99} - I_{01}}{I_{50}},$$

where $I_{99}$ is the $99^{th}$ percentile brightest pixel in the region, $I_{01}$ is the $1^{st}$ percentile brightest and $I_{50}$ is the median (other quantile values can be used). All of the haze detect parameters are stored and, as a function of time, the algorithm performs multiple tests for the presence of haze.

The following describes a further class of numerical parameters for haze detection that is contained in the algorithm. The use of multiple images, images through haze, and images without haze, breaks the ambiguity between the haze-free appearance of objects and the effects of haze. The following method works on image regions with some contrast even if there are no dark pixels in those regions. Image regions without contrast, such as regions containing only clear sky or completely overcast sky, do not produce a signal using this method. In the exemplary embodiment, intensity histograms are used to determine the amount of structure within the image and then look for reductions in the amount of structure that result from obscuration by fog. Non-histogram-based means of providing a metric indicating the amount of structure within the image may also be used. For example, a total numerical score or rank may be assigned to each region based on the intensities (relative, actual or normalized) for all pixels in the region. Other non-parametric models may also be used. Regardless, even non-histogram methods will ultimately involve an underlying histogram-like approach because the histogram measures all of the intensities in the reference object or block. In this approach, a time series of histograms and statistics derived from the histograms in each color component in each region of the segmented image is stored in memory. The stored data serves as the "reference object" in this embodiment so that storage of complete images taken in the past is not necessary.

Figure 6:
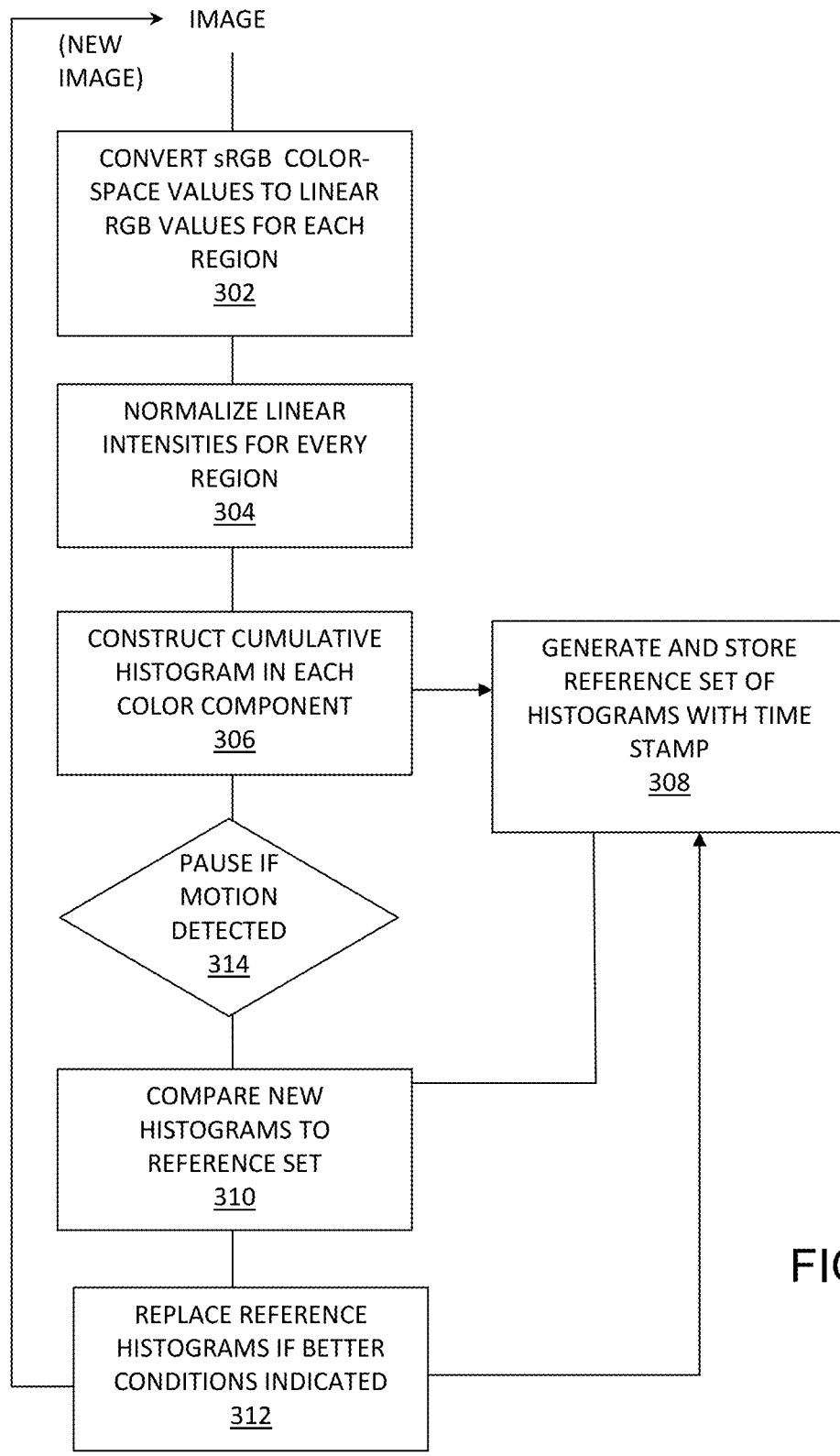
FIG. 6 is a block diagram of a sequence for generating reference histograms according to an embodiment of the invention.

Referring to FIG. 6, in order to detect haze, a histogram of the intensities in each region in each of the color components, R, G, and B, is calculated in linear intensity space. This is done by converting the sRGB color-space video values to linear RGB values (step 302). Prior to creating the histograms, in step 304, the linear intensities in every region are "normalized" by dividing each by the intensity of the $99^{th}$ percentile brightest pixel in that region: $I'(x, y)=I(x, y)/I_{99}$. The intensities, in the linear intensity space, before and after normalization are restricted to the range [0.0, 1.0]. Spreading the histogram out by setting the top of the intensity range equal to the $99^{th}$ percentile intensity reduces the sensitivity of the histogram to illumination changes that influence the image. In step 306, a cumulative histogram is then constructed in each color component from the histogram. A first set of cumulative histograms is stored in long-term memory with time-of-day and date information (step 308). The first set of cumulative histograms constitutes a reference set stored and sampled at a uniform time interval (typically 15 minutes). All the cumulative histograms have the same value (1.0) at the $99^{th}$ percentile because the intensities have been "normalized". The reference histograms stored as a function of time make it possible for the algorithm to remove some of the illumination differences that would mimic the presence of haze.

When a new video image is acquired, returning to step 302, its intensities are "normalized" in each region (step 304), and a new set of histograms is computed for each region in the new image (step 306). These new histograms are compared to the reference histograms in step 310, with the best "clear" histograms in the corresponding color stored with the nearest time-of-day stamp but differing by an integral number of days. This is done in near real time. Comparing the cumulative histograms, based on "normalized" intensity values, is done by subtracting the two histograms and summing (integrating) the difference. The binning for all histograms can, be need not be the same. Using 255 bins of uniform size spanning the intensity range from zero to the maximum image value is one possibility and works well for 8-bit data. The integral can be performed by summing the difference in each bin and dividing by the number of bins. Haze, in general, reduces the contrast between the darkest pixel and the brightest pixel in a region—this produces a difference between the cumulative histograms and a non-zero integral when the two histograms are compared using the integrated difference. The sign of the integral changes from positive to negative when the histogram transitions from being broader than the reference histogram to narrower than the reference histogram. For haze detection, a useful threshold is a −0.1 relative change for this integral wherein the maximum area corresponds to −1.0 (the cumulative distribution has a range from 0 to 1.0 and the intensity bins cover a total range from 0 to 1.0 in intensity). In regions without contrast, the histogram is very narrow with or without haze and the cumulative histograms are near zero for values below the 99$^{th}$ percentile. Regions such as flat sky do not allow for haze detection using this method.

The above method can be made to evolve in time by averaging or replacing the reference histograms as video from days with better weather conditions becomes available (step 312). Of two similar histograms based on "normalized" intensities, with the same time-of-day stamp, the one with the widest histogram is stored as the reference. The threshold can also evolve with time, starting with some value that requires very heavy fog to trigger detection (for example −0.5 for the value of the integrated cumulative histogram difference described above) and evolving to values that require less fog. The resetting of the threshold is controlled by the measured variance in the fog parameter as a function of time compared to the variance in the fog parameter for other regions in the image. A small variance and consistent variances in nearby regions triggers a decrease of the threshold to a more sensitive value limited to some minimum threshold. Motion detection (step 314) integrated into the algorithm, stops the comparison of histograms when a transient object temporarily enters a region, pausing the process until normal conditions resume.

Figure 7:
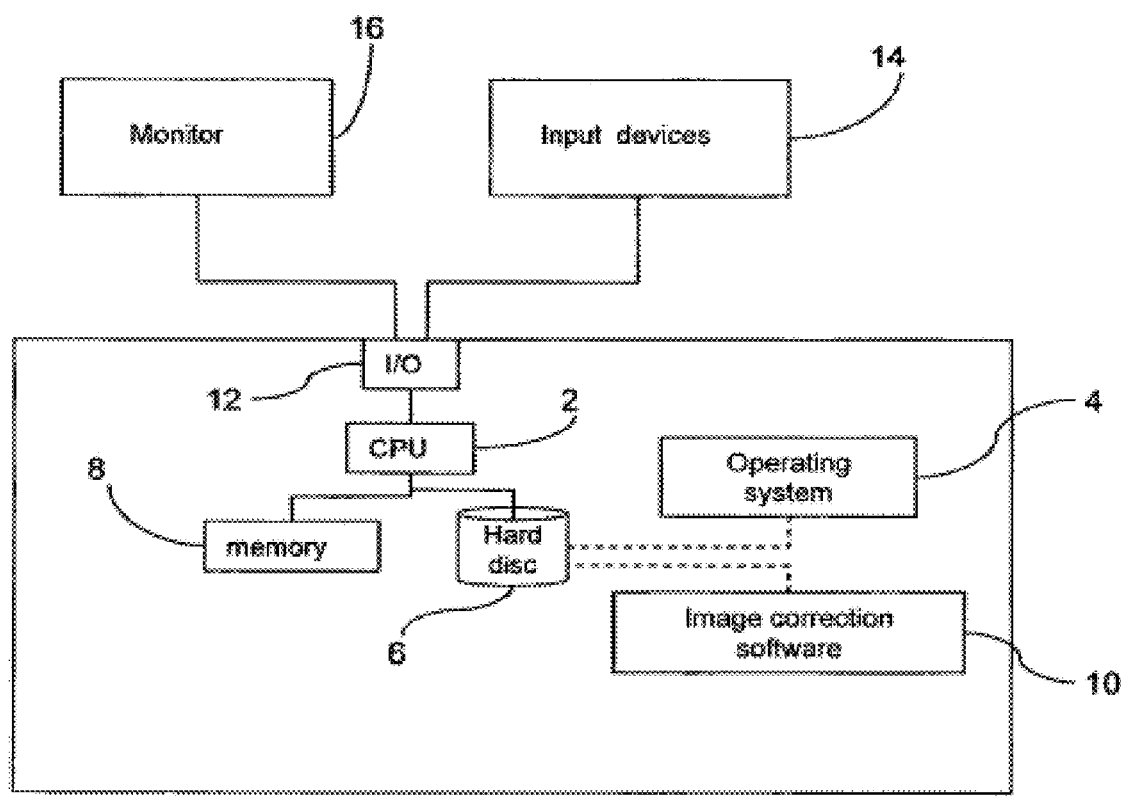
FIG. 7 illustrates an exemplary computer system appropriate for executing a method according to the invention.

FIG. 7 illustrates an exemplary computer system that may be used to perform a method according to an embodiment of the invention. The computer system comprises a central processing unit (CPU) 2, operating system software 4, a hard disc 6, memory 8, an in/out (I/O) system 12, and haze detection and/or image correction software 10. In this embodiment, the haze detection/image correction software 10 may comprise a computer program, or a suite of computer programs operable to carry out a method according to the embodiment of the invention. The algorithm(s) may be implemented as software, firmware, hardware, or a combination thereof. As mentioned above, the inventive image processing algorithm may be implemented via a FPGA. The I/O system 12 is connected to input devices 14 and a monitor 16, which is operable to display images before and after processing by an embodiment of the present invention. Additional output devices may include a video recorder and/or other image/video storage devices or media (external hard drive, recordable DVD, recordable CD, digital memory card, SD card, SDHC card, etc.) for creating a permanent or semi-permanent record of activity within the FOV over time. In some applications, GPS data may be collected along with other data useful for creating a record to facilitate extraction of additional data from the saved images. User interface/input devices may include a keyboard, a mouse, an electronic pen, a touch screen, or a haptic device, which may be used to select and manage images for correction according to an embodiment of the invention.

The computer system may operate in a networked environment using logical connections to one or more remote computers, such as a personal computer, a hand-held device, a server, a router, a network PC, a peer device or other common network node. Network connections (wired or wireless) may be used to transmit the saved images (raw and processed) for remote storage and/or analysis. Such networking environments are commonplace in offices, enterprise-wide computer networks, intranets, the Internet, and other distributed network environments.

The present invention provides a method for determining the amount of haze or aerosol obscurant within the field of view of an image sensor that is particularly suitable for meeting the needs of video dehazing, for extraction of information from surveillance systems. The inventive method is computationally efficient, allowing for real time or near-real time measurement of haze within an image, which may be used for determining characteristics of the haze as well as for applying corrective measures to remove haze and clarify the image.

The invention claimed is:

1. A method for determining a level of haze within a field of view of an image sensor adapted for detecting one or more color components, the method comprising:
   (a) collecting a first image of one or more objects within the field of view at a first point in time at which a first set of haze conditions are present;
   (b) defining one or more regions of the first image as a reference;
   (c) determining reference intensities for each of the one or more color components for the reference;
   (d) collecting at least one second image of one or more objects within the field of view at one or more second points in time at which a different second set of haze conditions are present;
   (e) determining intensities for each of the one or more color components within the at least one second image;
   (f) comparing the intensities for each of the one or more color components of the at least one second image against the reference intensities;
   (g) if the intensities of the at least one second image differs from the reference intensity by more than a predetermined threshold, designating all or a portion of the at least one second image as being obscured by haze; and
   (h) generating an output identifying the designated portions of the at least second image as requiring correction.

2. The method of claim 1, wherein the one or more regions of the first image correspond to one or more stationary objects within the field of view, and wherein optical properties of the one or more stationary objects and distances between the image sensor and the one or more stationary objects are at least approximately known.

3. The method of claim 2, wherein the step of determining reference intensities further comprises calculating an optical depth to each of the one or more stationary objects.

4. The method of claim 3, wherein the step of determining intensities for each of the one or more color components within the at least one second image comprises calculating an optical depth to each of the one or more stationary objects at the one or more second points in time, and the step of comparing includes determining a change in the optical depth to determine a level of obscuration at the one or more second points in time.

5. The method of claim 1, wherein the first set of haze conditions comprise ideal conditions or correctable to near-ideal conditions.

6. The method of claim 1, wherein the one or more color components comprise a plurality of colors of a standard color model.

7. The method of claim 6, wherein the standard color model is RGB.

8. The method of claim 1, further comprising processing the output to remove effects of the haze from the image.

9. The method of claim 1, wherein the step of defining one or more regions of the first image comprises segmenting the first image into a plurality of tiles to define a plurality of reference tiles.

10. The method of claim 9, wherein the step of determining reference intensities comprises normalizing intensity values for each of the one or more color components for each region and generating a cumulative histogram of intensity for each of the one or more color components to define a reference set of histograms.

11. The method of claim 9, wherein the step of determining intensities for each of the one or more color components within the at least one second image comprises segmenting the at least one second image into the plurality of tiles, normalizing intensity values for each color component for each tile and generating a cumulative histogram of intensity for each color component to define a second set of histograms, wherein the second set of histograms is compared against the reference set of histograms.

12. The method of claim 11, further comprising replacing the reference set of histograms with the second set of histograms if the step of comparing indicates decreased haze conditions in the at least one second image.

13. The method of claim 12, wherein decreased haze conditions correspond to a broader histogram.

14. A non-transitory machine-readable medium comprising a plurality of instructions, that in response to be executed, result in a processor executing the steps of:
(a) collecting a first image of one or more objects within the field of view of an image sensor at a first point in time at which a first set of haze conditions are present, wherein the image sensor is adapted to detect one or more color components;
(b) defining one or more regions of the first image as a reference;
(c) determining reference intensities for each of the one or more color components for the reference;
(d) collecting at least one second image of one or more objects within the field of view at one or more second points in time at which a different second set of haze conditions are present;
(e) determining intensities for each of the one or more color components within the at least one second image;
(f) comparing the intensities for each of the one or more color components of the at least one second image against the reference intensities;
(g) if the intensities of the at least one second image differs from the reference intensity by more than a predetermined threshold, designating all or a portion of the at least one second image as being obscured by haze; and
(h) generating an output identifying the designated portions of the at least second image as requiring correction.

15. The non-transitory machine readable medium of claim 14, wherein the one or more regions of the first image correspond to one or more stationary objects within the field of view, and wherein optical properties of the one or more stationary objects and distances between the image sensor and the one or more stationary objects are at least approximately known.

16. The non-transitory machine readable medium of claim 15, wherein the step of determining reference intensities further comprises calculating an optical depth to each of the one or more stationary objects.

17. The non-transitory machine readable medium of claim 16, wherein the step of determining intensities for each color component within the at least one second image comprises calculating an optical depth to each of the one or more stationary objects at the one or more second points in time, and the step of comparing includes determining a change in the optical depth to determine a level of obscuration at the one or more second points in time.

18. The non-transitory machine readable medium of claim 14, wherein the first set of haze conditions comprise ideal conditions or correctable to near-ideal conditions.

19. The non-transitory machine readable medium of claim 14, wherein the one or more color components comprise a plurality of colors of a standard color model.

20. The non-transitory machine readable medium of claim 19, wherein the standard color model is RGB.

21. The non-transitory machine readable medium of claim 14, further comprising processing the output to remove effects of the haze from the image.

22. The non-transitory machine readable medium of claim 14, wherein the step of defining one or more regions of the first image comprises segmenting the first image into a plurality of tiles to define a plurality of reference tiles.

23. The non-transitory machine readable medium of claim 22, wherein the step of determining reference intensities comprises normalizing intensity values for each color component for each region and generating a cumulative histogram of intensity for each color component to define a reference set of histograms.

24. The non-transitory machine readable medium of claim 22, wherein the step of determining intensities for each of the one or more color components within the at least one second image comprises segmenting the at least one second image into the plurality of tiles, normalizing intensity values for each of the one or more color components for each tile and generating a cumulative histogram of intensity for each of the one or more color components to define a second set of histograms, wherein the second set of histograms is compared against the reference set of histograms.

25. The non-transitory machine readable medium of claim 24, further comprising replacing the reference set of histograms with the second set of histograms if the step of comparing indicates decreased haze conditions in the at least one second image.

26. The non-transitory machine readable medium of claim 25, wherein decreased haze conditions correspond to a broader histogram.

27. A method for determining a level of haze within a field of view of an image sensor, the method comprises:
detecting one or more color components by collecting a first image of one or more objects within the field of view at a first point in time at which a first set of haze conditions are present;
defining one or more regions of the first image by segmenting the first image into a plurality of tiles to define a plurality of reference tiles;
determining reference intensities for each color component by normalizing intensity values for each of the one or more color components for each reference tile and generating a cumulative histogram of intensity for each of the one or more color components to define a reference set of histograms;
collecting at least one second image of one or more objects within the field of view at one or more second points in time at which a different second set of haze conditions are present;
determining intensities for each of the one or more color components within the at least one second image by segmenting the at least one second image into the plurality of tiles, normalizing intensity values for each of the one or more color components for each tile and generating a cumulative histogram of intensity for each of the one or more color components to define a second set of histograms;

comparing the second set of histograms against the reference set of histograms;

if the second set of histograms differs from the reference set of histograms by more than a predetermined threshold, designating one or more tiles within the at least one second image as being obscured by haze; and generating an output identifying the one or more tiles of the at least second image as requiring correction.

28. The method of claim 27, further comprising replacing the reference set of histograms with the second set of histograms if the step of comparing indicates decreased haze conditions in the at least one second image, wherein decreased haze conditions are determined based on the relative widths of the histograms.

* * * * *